United States Patent
Okamoto et al.

(10) Patent No.: US 6,562,900 B2
(45) Date of Patent: May 13, 2003

(54) PRODUCTION PROCESS FOR POLYARYLENE SULFIDE

(75) Inventors: Masaya Okamoto, Ichihara (JP); Minoru Senga, Ichihara (JP); Toru Bando, Ichihara (JP)

(73) Assignees: Petroleum Energy Center, Tokyo (JP); Idemitsu Petrochemical Co., Ltd., Ichihara (JP)

( * ) Notice: Subject to any disclaimer, the term of this patent is extended or adjusted under 35 U.S.C. 154(b) by 9 days.

(21) Appl. No.: 09/895,315

(22) Filed: Jul. 2, 2001

(65) Prior Publication Data

US 2002/0019501 A1 Feb. 14, 2002

(30) Foreign Application Priority Data

Jul. 7, 2000 (JP) ........................................ 2000-205995

(51) Int. Cl.$^7$ ............................ C08L 81/02; C08G 75/04
(52) U.S. Cl. ........................................ 524/609; 528/388
(58) Field of Search ............................. 528/388; 524/609

(56) References Cited

U.S. PATENT DOCUMENTS 5,008,368 A * 4/1991 Nesheiwat .................. 528/388

FOREIGN PATENT DOCUMENTS

JP 04255720 A * 9/1992 ........... C08G/75/02

* cited by examiner

Primary Examiner—Robert Dawson
Assistant Examiner—Marc S. Zimmer
(74) Attorney, Agent, or Firm—Oblon, Spivak, McClelland, Maier & Neustadt, P.C.

(57) ABSTRACT

Provided is a production process for polyarylene sulfide having a high molecular weight and an excellent heat stability. It is a production process for polyarylene sulfide by reacting a dihalogenoaromatic compound with metal sulfide in a polar solvent, wherein all or a part of water required for the reaction is added on a condition that the reaction system is 100° C. or higher, whereby obtained is polyarylene sulfide which is reduced in an intrinsic viscosity [η] by 0.05 deciliter/g or less at 206° C. when added to an N-methyl-2-pyrrolidone solvent is the polyarylene sulfide of an amount equivalent to the solvent and it is maintained at 265° C. for 8 hours.

7 Claims, No Drawings

PRODUCTION PROCESS FOR POLYARYLENE SULFIDE

BACKGROUND OF THE INVENTION

The present invention relates to a production process for a polyarylene sulfide (hereinafter abbreviated as PAS) resin. More specifically, it relates to a production process for a PAS resin having a high molecular weight and an excellent heat stability, a PAS resin having such characteristics, a resin composition comprising this PAS resin and an inorganic filler and a molded article comprising this resin composition.

RELATED ART

Polyarylene sulfide, especially polyphenylene sulfide is known as an engineering plastic which is excellent in a mechanical strength and a heat resistance and which has good electric characteristics and a high rigidity, and it is widely used as various materials such as base materials for electric and electronic equipment parts. In particular, articles of a resin composition comprising polyphenylene sulfide and an inorganic filler are used for various uses.

In a conventional production process in which a dihalogen aromatic compound such as p-dichlorobenzene is reacted with alkaline metal sulfide in a polar solvent such as N-methyl-2-pyrrolidone to thereby obtain PAS, alkaline metal sulfide is insoluble in the polar solvent, and therefore a prescribed amount of water is added. In this case, alkaline metal sulfide is dissolved in the solvent by virtue of the presence of water, and a part thereof is subjected to hydrolysis and changed to metal hydrosulfide. This alkaline metal hydrosulfide works as a chain-transfer agent, so that a molecular weight of PAS is inhibited from going up or a terminal of the polymer is turned into —SH. This brings about the problem that PAS having an inferior heat stability is produced.

In order to solve this problem, provided are a method in which water is added and then pre-polymerization is carried out at a low temperature to thereby turn PAS into a high polymer (Japanese Patent Application Laid-Open No. 9228/1989) and a method in which a small amount of water is added and then pre-polymerization is carried out to thereby raise a conversion of alkaline metal sulfide, followed by adding water to carry out polycondensation (Japanese Patent Application Laid-Open No. 7332/1986). However, they are not satisfactory in terms of obtaining PAS having a high molecular weight and an excellent heat stability.

SUMMARY OF THE INVENTION

The present invention has been made in light of the problem described above, and an object thereof is to provide a production process for PAS having a high molecular weight and an excellent heat stability.

Another object of the present invention is to provide PAS having a high molecular weight and an excellent heat stability.

Intensive investigations repeated by the present inventors have resulted in finding that in a process for producing polyarylene sulfide by reacting a dihalogen aromatic compound with metal sulfide in a polar solvent, all or a part of water required for the reaction is added on a condition that the reaction system is 100° C. or higher, whereby the objects described above can be achieved. Thus, they have completed the present invention.

That is, the present invention comprises the following essential points.

(1) Polyarylene sulfide which is reduced in an intrinsic viscosity [η] by 0.05 deciliter/g or less at 206° C. when added to an N-methyl-2-pyrrolidone solvent is the polyarylene sulfide of an amount equivalent to that of the solvent and it is maintained at 265° C. for 8 hours.

(2) The polyarylene sulfide as described in the above item (1), wherein the polyarylene sulfide is a homopolymer or a copolymer comprising 70 mole % or more of a paraphenylene sulfide unit as a repeating unit.

(3) The polyarylene sulfide as described in the above item (2), wherein the polyarylene sulfide comprises a copolymerization structural unit selected from a metaphenylene sulfide unit, an orthophenylene sulfide unit, a p,p'-diphenylene ketone sulfide unit, a p,p'-diphenylene sulfone sulfide unit, a p,p'-biphenylene sulfide unit, a p,p'-diphenylene ether sulfide unit, a p,p'-diphenylenemethylene sulfide unit, a p,p'-diphenylenecumenyl sulfide unit and a naphthyl sulfide unit.

(4) A production process for polyarylene sulfide by reacting a dihalogen aromatic compound with metal sulfide in a polar solvent, wherein all or a part of water required for the reaction is added on a condition that the reaction system is 100° C. or higher to obtain the polyarylene sulfide as described in the above item (1).

(5) The production process as described in the above item (4), wherein the dihalogenoaromatic compound is selected from dihalogenobenzenes, dihalogenoalkyl-substituted benzenes or dihalogenocycloalkyl-substituted benzenes, dihalogenoaryl-substituted benzenes, dihalogenobiphenyls and dihalogenonaphthalenes.

(6) The production process as described in the above item (4), wherein water is added on a condition that the reaction system is 100 to 270° C.

(7) The production process as described in the above item (4), wherein a use amount of the dihalogen compound is 0.8 to 1.2 in terms of a mole ratio based on the metal sulfide.

(8) The production process as described in the above item (4), wherein a use amount of water is 0.05 to 4.0 in terms of a mole ratio based on the metal sulfide.

(9) A polyarylene sulfide resin composition comprising 20 to 90% by weight of the polyarylene sulfide as described in the above item (1) and 80 to 10% by weight of an inorganic filler.

(10) An article prepared by molding the polyarylene sulfide resin composition as described in the above item (9).

DESCRIPTION OF THE PREFERRED EMBODIMENTS

The present invention shall specifically be explained below.

1. Polyarylene Sulfide (PAS)

The PAS of the present invention is a polyarylene sulfide resin in which polyarylene sulfide (PAS) is reduced in an intrinsic viscosity [η] by 0.05 deciliter/g or less, preferably 0.03 deciliter/g or less and particularly preferably 0.02 deciliter/g or less at 206° C. when added to an N-methyl-2-pyrrolidone(NMP) solvent is the polyarylene sulfide of an amount equivalent to that of the solvent and it is maintained at 265° C. for 8 hours. The above resin is excellent in a heat stability and therefore can be used for various severe uses.

A method for evaluating a heat stability in the present invention is suitably a method in which a mixture of PAS and NMP is used and this mixture is maintained at a high temperature (265° C.) for 8 hours to observe a change in an intrinsic viscosity [η]. In this case, a mixing proportion of PAS to NMP is optional, but in order to elevate the reproducibility, both are mixed in an equivalent amount, for example, each 2.5 g. Taking a solubility of this kind of the resin into consideration, the intrinsic viscosity [η] is conveniently expressed by the value at 206° C.

The PAS produced by the production process of the present invention is, for example, a polymer having 70 mole % or more of a repeating unit represented by a structural formula —Ar—S— (wherein A is an arylene group). A representative thereof includes PPS having 70 mole % or more of a repeating unit represented by the following structural formula

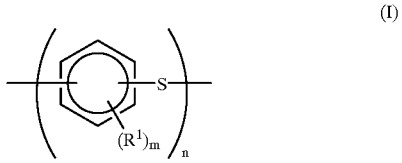

(I)

(wherein $R^1$ represents a substituent selected from an alkyl group having 6 or less carbon atoms, an alkoxy group, a phenyl group, a carboxylic acid/metal salt group, an amino group, a nitro group and a halogen atom such as fluorine, chlorine and bromine; m represents an integer of 0 to 4; and n represents an average degree of polymerization and falls in a range of 10 to 200) or PPS represented by the following structural formula (II):

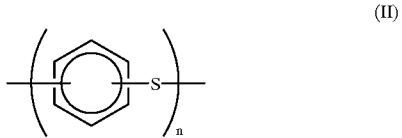

(II)

(wherein n is synonymous with n in Formula (I).

In general, known according to a production process thereof are PAS which is substantially linear and has a molecular structure having no branched and cross-linking structures and PAS of a molecular structure having branched and cross-linking structures. The production process of the present invention is effective for either type thereof. The PAS includes a homopolymer or a copolymer each comprising 70 mole % or more, preferably 80 mole % or more of a paraphenylene sulfide unit as a repeating unit. The copolymerization structural unit includes, for example, a metaphenylene sulfide unit, an orthophenylene sulfide unit, a p,p'-diphenylene ketone sulfide unit, a p,p'-diphenylene sulfone sulfide unit, a p,p'-biphenylene sulfide unit, a p,p'-diphenylene ether sulfide unit, a p,p'-diphenylenemethylene sulfide unit, a p,p'-diphenylenecumenyl sulfide unit and a naphthyl sulfide unit. Further, capable of being included in the polyarylene sulfide of the present invention are, in addition to the substantially linear polymers described above, branched or cross-linked polyarylene sulfides in which a small amount of a monomer having three or more functional groups is mixed and used as a part of the monomer for polymerization and blended polymers obtained by blending them with the linear polymers described above.

2. Production Process of PAS
(1) Raw Materials
① Dihalogenoaromatic Compound

The dihalogenoaromatic compound used for the production process of the present invention includes, for example, dihalogenobenzenes such as m-dihalobezene and p-dihalobezene; dihalogenoalkyl-substituted benzenes or dihalogenocycloalkyl-substituted benzenes such as 2,3-dihalotoluene, 2,5-dihalotoluene, 2,6-dihalotoluene, 3,4-dihalotoluene, 2,5-dihaloxylene, 1-ethyl-2,5-dihalobenzene, 1,2,4,5-tetramethyl-3,6-dihalobenzene, 1-normal hexyl-2,5-dihalobenzene and 1-cyclohexyl-2,5-dihalobenzene; dihalogenoaryl-substituted benzenes such as 1-phenyl-2,5-dihalobenzene, 1-benzyl-2,5-dihalobenzene and 1-p-toluyl-2,5-dihalobenzene; dihalogenobiphenyls such as 4,4'-dihalobiphenyl; and dihalogenonaphthalenes such as 1,4-dihalonaphthalene, 1,6-dihalonaphthalene and 2,6-dihalonaphthalene.

② Polar Solvent

In general, the polar solvent used in the present invention includes polar organic compounds (for example, amide compounds, lactam compounds, urea compounds, organic sulfur compounds and cyclic organic phosphorus compounds), and they can suitably be used in the form of a single solvent or a mixed solvent.

Among these polar solvents, capable of being given as the amide compound described above are, for example, N,N-dimethylformamide, N,N-diethylformamide, N,N-dimethylacetamide, N,N-diethylacetamide, N,N-dipropylacetamide and N,N-dimethylbenzoic acid amide.

Capable of being given as the lactam compound described above are, for example, caprolactam, N-alkylcaprolactams such as N-methylcaprolactam, N-ethylcaprolactam, N-isopropylcaprolactam, N-isobutylcaprolactam, N-normal propylcaprolactam, N-normal butylcaprolactam and N-cyclohexylcaprolactam, N-methyl-2-pyrrolidone (NMP), N-ethy-2-pyrrolidone, N-isopropyl-2-pyrrolidone, N-isobutyl-2-pyrrolidone, N-normal propyl-2-pyrrolidone, N-normal butyl-2-pyrrolidone, N-cyclohexyl-2-pyrrolidone, N-methyl-3-methyl-2-pyrrolidone, N-ethyl-3-methyl-2-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone and N-methyl-3-ethyl-2-piperidone.

Capable of being given as the urea compound described above are, for example, tetramethylurea, N,N'-dimethylethyleneurea and N,N'-dimethylpropyleneurea.

Further, capable of being given as the organic sulfur compound described above are, for example, dimethylsulfoxide, diethylsulfoxide, diphenylsulfone, 1-methyl-1-oxosulfolane, 1-ethyl-1-oxosulfolane and 1-phenyl-1-oxosulfolane, and capable of being given as the cyclic organic phosphorus compound described above are, for example, 1-methyl-1-oxophosphorane, 1-normal propyl-1-oxophosphorane and 1-phenyl-1-oxophosphorane.

These various polar organic compounds each can be used alone or in a mixture of two or more kinds thereof, and they can further be used as the polar solvent described above in a mixture with other solvent components which do not exert troubles on the objects of the present invention.

Among the various polar solvents described above, N-alkylcaprolactams and N-alkylpyrrolidones are preferred, and N-methyl-2-pyrrolidone is particularly preferred.

③ Metal Sulfide

Alkaline metal compounds such as sodium sulfide, lithium sulfide and potassium sulfide can mainly be used as the metal sulfide. They may be used alone or in a mixture of two or more kinds thereof. Further, alkaline earth metal sulfides and other sulfur sources may be used in combination.

④ Others

A comonomer, a branching agent and a terminator may be used in combination with the dihalogenocompound as long as the effects of the present invention are not damaged. The comonomer and the branching agent may be copolymerized. The comonomer includes 2,3-dichlorophenol, 2,3-dibromophenol, 2,4-dichlorophenol, 2,4-dibromophenol, 2,5-dichlorophenol, 2,5-dibromophenol, 2,4-dichloroaniline, 2,4-dibromoaniline, 2,5-dichloroaniline, 2,5-dibromoaniline, 3,3'-dichloro-4,4'-diaminobiphenyl, 3,3'-dibromo-4,4'-diaminobiphenyl, 3,3'-dichloro-4,4'-dihydroxybiphenyl, 3,3'-dibromo-4,4'-dihydroxybiphenyl, di(3-chloro-4-amino)phenylmethane, m-dichlorobenzene, m-dibromobenzene, o-dichlorobenzene, o-dibromobenzene, 4,4'-dichlorodipheyl ether and 4,4'-dichlorodipheyl sulfone. The branching agent includes 1,2,4-trichlorobenzene, 1,3,5-trichlorobenzene and 1,2,3-trichlorobenzene.

The terminator includes halogenated phenols such as p-bromophenol, m-bromophenol, o-bromophenol, p-chlorophenol, m-chlorophenol, o-chlorophenol, p-fluorophenol, m-fluorophenol, o-fluorophenol, p-iodophenol, m-iodophenol and o-iodophenol. Among them, p-bromophenol and p-chlorophenol are preferred.

(2) Production of Polyarylene Sulfide

① Addition Temperature and Adding Method of Water

All or a part of water is added on a condition that the reaction system is 100° C. or higher, preferably 100 to 270° C., more preferably 150 to 260° C. and particularly preferably 180 to 240° C. If this temperature is lower than 100° C., the resulting PAS is reduced in a heat stability, and if it exceeds 270° C., the reaction goes on suddenly, so that the PAS having a high molecular weight can not be obtained.

When a part of water is added, the remaining part of water required for the reaction may be charged in advance into a reactor together with the metal sulfide and the dihalogenoaromatic compound. In the present invention, all water is preferably added at a high temperature. Water may be fed together with the polar solvent under heating. Water is preferably distilled water. Capable of being employed as a method for adding water is a method in which a closed bomb is charged with a mixture of water and the polar solvent and installed in an autoclave in the form of a loop type and in which pressure is balanced and water is dropped by virtue of gravity.

② Use Ratio of Raw Materials

A use amount of the dihalogenocompound is preferably 0.8 to 1.2, more preferably 0.9 to 1.1 and particularly preferably to 0.95 to 1.05 in terms of a mole ratio based on the metal sulfide. If this mole ratio falls outside a range of 0.8 to 1.2, the PAS having a high molecular weight is likely to be unobtainable.

A use amount of water is preferably 0.05 to 4.0, more preferably 0.1 to 3.0 and particularly preferably 0.15 to 2.5 in terms of a mole ratio based on the metal sulfide. If this mole ratio is less than 0.05, the reaction is likely to be unsatisfactory, and if this mole ratio exceeds 4.0, the PAS having a high molecular weight is likely to be unobtainable.

In the present invention, allowed to be added in order to accelerate the reaction are, in addition to the raw materials described above, metal hydroxides such as alkaline metal hydroxides and metal N-methylaminobutyric acid salts such as alkaline metal N-methylaminobutyric acid salts. A use amount of these additives is preferably 0.01 to 1.0, more preferably 0.05 to 0.8 and particularly preferably 0.1 to 0.6 in terms of a mole ratio based on the metal sulfide.

③ Reaction Method

After adding water, the single stage reaction may be carried out at 230 to 290° C., preferably 240 to 280° C. and more preferably 250 to 270° C., and before the polycondensation, pre-polymerization may be carried out at 180 to 230° C., preferably 190 to 220° C. and more preferably 195 to 215° C. A reaction time in the polycondensation is 0.5 to 10 hours, preferably 1.0 to 10 hours and more preferably 1.5 to 10 hours. If this reaction time is shorter than 0.5 hour, the reaction goes on insufficiently, and therefore the molecular weight is likely to be insufficiently elevated. On the other hand, even if the reaction time exceeds 10 hours, the specific effect shall not be obtained. A reactor of either batch type or continuous type can be used.

The PAS resin composition of the present invention comprises 20 to 90% by weight of the PAS obtained by the method described above and 80 to 10% by weight of the inorganic filler, preferably 20 to 70% by weight of the PAS and 80 to 30% by weight of the inorganic filler and more preferably 40 to 70% by weight of the PAS and 60 to 30% by weight of the inorganic filler. Capable of being given as the inorganic filler are glass fiber, carbon fiber, aramide fiber, potassium titanate whisker, silicon carbide whisker, mica ceramic fiber, wollastonite, mica, talc, silica, alumina, kaolin, clay, silica-alumina, carbon black, calcium carbonate, titanium oxide, lithium carbonate, molybdenum disulfide, graphite, iron oxide, glass beads, calcium phosphate, calcium sulfate, magnesium carbonate, magnesium phosphate, silicon nitride and hydrotalcite. These inorganic fillers can be used alone or in combination of two or more kinds thereof. Among them, glass fiber is particularly preferred.

The glass fiber shall not specifically be restricted and may be any of alkaline glass, low alkaline glass and non-alkaline glass. A fiber length thereof is preferably 0.1 to 8 mm, more preferably 0.3 to 6 mm, and a fiber diameter thereof is preferably 0.1 to 30 $\mu$m, more preferably 0.5 to 25 $\mu$m. A fiber length of smaller than 0.1 mm reduces the reinforcing effect, and that of larger than 8 mm lowers the flowability. A fiber diameter of smaller than 0.1 $\mu$m reduces the flowability, and that of larger than 30 $\mu$m lower the strength. Further, a form of the glass fiber shall not specifically be restricted and includes, for example, various ones such as roving, milled fiber and chopped strand. These glass fibers can be used alone or in combination of two or more kinds thereof.

In order to elevate an affinity with the resin, the glass fiber may be subjected to surface treatment with a silane coupling agent of an aminosilane, an epoxysilane, a vinylsilane and a methacrylsilane, a titanate coupling agent including tetramethyl·orthotitanate and tetraethyl·orthotitanate, a chromium complex compound and a boron compound.

A method for preparing the PAS resin composition of the present invention shall not specifically be restricted, and the composition can be prepared by blending the PAS, the inorganic filler and the additives such as a silane coupling agent, an antioxidant, a heat stabilizer, a lubricant, a plasticizer, a conductivity-providing agent, a colorant and a pigment each used if necessary, mixing them by means of a tumble blender or a Henschell mixer and melting, kneading and pelletizing by means of a single extruder or a multiple extruder or melting, kneading and pelletizing by means of a kneader or a banbury mixer.

The molded article of the present invention can be produced by molding the PAS resin composition described above by a method such as an injection-molding method or an extrusion-molding method.

EXAMPLES

The present invention shall more specifically be explained below with reference to examples. A heat stability of the PAS was evaluated by the following method.

(1) Method for Heat Stability Experiment

A pressure-tight cell (made of SUS 316) having a content volume of 10 ml was charged with 2.5 g of PAS and 2.5 g of NMP and tightly sealed. This cell was heated up to 265° C. in an oil bath and maintained at this temperature for 8 hours. Then, the cell was drawn up and cooled down to take PAS out, and it was washed with water and then dried to determine an intrinsic viscosity [η] by the following method. Measurement of intrinsic viscosity:

The sample of 0.04±0.001 g was dissolved in 10 ml of α-chloronaphthalene at 235° C. in 15 minutes to measure the viscosity obtained in a constant temperature bath of 206° C. and a relative viscosity thereof to a viscosity of α-chloronaphthalene. This value was used to calculate the intrinsic viscosity [η] according to the following equation:

$$[\eta] \ (deciliter/g) = \ln \ (relative \ viscosity)/(polymer \ concentration)$$

Example 1

An autoclave having a volume of 1 liter was charged with 23.1 g (0.503 mole) of lithium sulfide, 1.96 g (81.8 millimole) of anhydrous lithium hydroxide and 188 ml of NMP and maintained at 215° C. Added thereto was a solution, which was heated in advance to 100° C., of 75.3 g (0.512 mole) of p-dichlorobenzene, 6.46 g (0.359 mole) of water and 75.3 ml of NMP to carry out pre-polymerization at 200° C. for 5 hours. Then, the temperature was elevated up to 260° C. to carry out polymerization for 3 hours. A revolution of the stirring blades was set to 320 rpm. After finishing the polymerization, the temperature was lowered down to 100° C. to filter a granular polymer precipitated. The polymer thus obtained was washed twice with hot water and washed lastly with acetone. This was vacuum-dried at 120° C. for 12 hours to obtain PAS. The resulting PAS was subjected to the heat stability experiment. The result thereof is shown in Table 1.

Comparative Example 1

An autoclave having a volume of 1 liter was charged with 23.1 g (0.503 mole) of lithium sulfide, 1.96 g (81.8 millimole) of anhydrous lithium hydroxide, 75.3 g (0.512 mole) of p-dichlorobenzene, 6.46 g (0.359 mole) of water and 263.3 ml of NMP at a room temperature and heated up to 200° C. Then, the same operation as in Example 1 was carried out to obtain PAS. The resulting PAS was subjected to the heat stability experiment. The result thereof is shown in Table 1.

Example 2

The same operation as in Example 1 was carried out to obtain PAS, except that 10.1 g (81.8 millimole) of lithium N-methylaminobutyrate was substituted for anhydrous lithium hydroxide. The resulting PAS was subjected to the heat stability experiment. The result thereof is shown in Table 1.

Comparative Example 2

The same operation as in Comparative Example 1 was carried out to obtain PAS, except that 10.1 g (81.8 millimole) of lithium N-methylaminobutyrate was substituted for anhydrous lithium hydroxide. The resulting PAS was subjected to the heat stability experiment. The result thereof is shown in Table 1.

Example 3

The same operation as in Example 1 was carried out to obtain PAS, except that 39.3 g (0.503 millimole) of anhydrous sodium sulfide (manufactured by Sankyo Chemicals Co., Ltd.) was substituted for lithium sulfide. The resulting PAS was subjected to the heat stability experiment. The result thereof is shown in Table 1.

Comparative Example 3

The same operation as in Comparative Example 1 was carried out to obtain PAS, except that 39.3 g (0.503 millimole) of anhydrous sodium sulfide (manufactured by Sankyo Chemicals Co., Ltd.) was substituted for anhydrous lithium hydroxide. The resulting PAS was subjected to the heat stability experiment. The result thereof is shown in Table 1.

Example 4

An autoclave having a volume of 1 liter was charged with 23.1 g (0.503 mole) of lithium sulfide, 1.96 g (81.8 millimole) of anhydrous lithium hydroxide, 75.3 g (0.512 mole) of p-dichlorobenzene and 188 ml of NMP and maintained at 215° C. Added thereto was a solution, which was heated in advance to 100° C., of 6.46 g (0.359 mole) of water and 75.3 ml of NMP to carry out pre-polymerization at 200° C. for 5 hours. Then, the temperature was elevated up to 260° C. to carry out polymerization for 3 hours. A revolution of the stirring blades was set to 320 rpm. After finishing the polymerization, the temperature was lowered down to 100° C. to filter a granular polymer precipitated. The polymer thus obtained was washed twice with hot water and washed lastly with acetone. This was vacuum-dried at 120° C. for 12 hours to obtain PAS. The resulting PAS was subjected to the heat stability experiment. The result thereof is shown in Table 1.

TABLE 1

| | Result of heat stability experiment | |
|---|---|---|
| | Intrinsic viscosity η (dl/g) | Reduced amount of [η] |
| Example 1 | 0.35 | 0.03 |
| Example 2 | 0.34 | 0.02 |
| Example 3 | 0.21 | 0 |
| Example 4 | 0.35 | 0.03 |
| Comparative Example 1 | 0.30 | 0.25 |
| Comparative Example 2 | 0.31 | 0.28 |
| Comparative Example 3 | 0.15 | 0.11 |

Effects of the Invention

According to the present invention, PAS having a high molecular weight and an excellent heat stability can be obtained.

What is claimed is:

1. Polyarylene sulfide which is reduced in intrinsic visosity [η] by 0.05 deciliter/g or less after being maintained as a 50:50 weight solution in N-methyl-2-pyrrolidone at 265° C. for 8 hours, wherein the polyarylene sulfide is a homopolymer or a copolymer comprising 70 mole % or more of a paraphenylene sulfide unit as a repeating unit, and the intrinsic viscosity is measured at 206° C.

2. The polyarylene sulfide as described in claim 1, wherein the polyarylene sulfide comprises a copolymerization structural unit selected from a metaphenylene sulfide unit, an orthophenylene sulfide unit, a p,p'-diphenylene ketone sulfide unit, a p,p'-diphenylene sulfone sulfide unit, a p,p'-biphenylene sulfide unit, a diphenylene ether sulfide unit, a p,p'-diphenylenemethylene sulfide unit, a p,p'-diphenylenecumenyl sulfide unit and a naphthyl sulfide unit.

3. A production process for polyarylene sulfide of claim 1, comprising reacting a dihalogen aromatic compound with metal sulfide in a polar solvent, wherein all or a part of the water required for the reaction is added on a condition that the water is 100° C. or higher and the dihalogen aromatic compound is selected from dihalogenobenzenes, dihalogenoalkyl-substituted benzenes, dihalogenocycloalkyl-substituted benzenes, dihalogenoaryl-substituted benzenes, dihalogenobiphenyls, and dihalogenonaphthalenes.

4. The production process as described in claim 3, wherein a use amount of the dihalogen compound is 0.8 to 1.2 in terms of a mole ratio based on the metal sulfide.

5. The production process as described in claim 3, wherein a use amount of water is 0.05 to 4.0 in terms of a mole ratio based on the metal sulfide.

6. A polyarylene sulfide resin composition comprising 20 to 90% by weight of the polyarylene sulfide as described in claim 1 and 80 to 10% by weight of an inorganic filler.

7. An article prepared by molding the polyarylene sulfide resin composition as described in claim 6.

* * * * *